United States Patent [19]
Meshkat et al.

[11] Patent Number: 5,553,009
[45] Date of Patent: Sep. 3, 1996

[54] PARALLEL METHOD FOR SUBDIVISION OF ARBITRARY CURVED SOLIDS

[75] Inventors: Siavash N. Meshkat; Susan A. Meshkat, both of San Jose, Calif.

[73] Assignee: International Business Machines Corporation, Armonk, N.Y.

[21] Appl. No.: 551,440

[22] Filed: Nov. 1, 1995

Related U.S. Application Data

[63] Continuation of Ser. No. 119,755, Sep. 10, 1993, abandoned.
[51] Int. Cl.$^6$ .................................................. G06F 17/00
[52] U.S. Cl. .................................................. 364/578
[58] Field of Search .................................... 364/578, 570, 364/736, 512, 577; 395/120, 123, 141, 119

[56] References Cited

U.S. PATENT DOCUMENTS

| | | | |
|---|---|---|---|
| 3,889,107 | 6/1975 | Sutherland | 235/152 |
| 4,649,498 | 3/1987 | Kedem et al. | 364/518 |
| 4,742,473 | 5/1988 | Shugar et al. | 395/119 |
| 4,750,818 | 6/1988 | Cochran | 364/736 |
| 4,775,946 | 10/1988 | Anjyo | 395/119 |
| 4,797,842 | 1/1989 | Nackman et al. | 364/578 |
| 4,893,260 | 1/1990 | Arakawa | 364/564 |
| 4,912,664 | 3/1990 | Weiss et al. | 364/577 |
| 4,933,889 | 6/1990 | Meshkat et al. | 364/578 |
| 4,941,114 | 7/1990 | Shigyo et al. | 395/141 |
| 5,003,498 | 3/1991 | Ota et al. | 395/120 |
| 5,010,501 | 4/1991 | Arakawa | 395/120 |
| 5,088,054 | 2/1992 | Paris, II | 395/121 |
| 5,113,490 | 5/1992 | Winget | 395/119 |
| 5,125,038 | 6/1992 | Meshkat et al. | 382/22 |
| 5,214,752 | 5/1993 | Meshkat et al. | 395/123 |
| 5,315,537 | 5/1994 | Blacker | 364/570 |

OTHER PUBLICATIONS

A. Kela, M. Saxena & R. Perucchio, A Hierarchical Structure for Automatic Meshing and Adaptive FEM Analysis, Engineering Computations (Special Issue), Nov. 1986.

Primary Examiner—Ellis B. Ramirez
Attorney, Agent, or Firm—James C. Pintner

[57] ABSTRACT

A method and system are provided for subdividing an arbitrarily shaped object into a collection of geometric elements ("cells") having predefined, simple topologies which facilitate further subdivision into tetrahedra, and which are well suited for further applications, such as finite element calculations. Initially, a representation of the object includes one or more regions, at least one of the regions not meeting the definition of "cell", each region having vertices, edges, and faces. An edge is selected according to a priority scheme, and slices which run through the edge and which also either run through other edges or vertices of the representation, are coplanar with other faces of the representation, or have other predetermined attributes, are considered for use in subdividing the representation. A score, which was initially calculated for the representation, is recalculated for hypothetical subdivisions of the representation incorporating each respective one of such slices. The scores are related to predetermined factors, such as the number of regions which are cells, relative to the total number of regions, the number of faces whose topologies correspond with the topologies of faces of cells, relative to the total number of faces, and factors relating to the shapes of the regions and faces. For one of the slices, the score is maximized. The representation is then subdivided, using that slice. This process is repeated until no regions of the representation remain which do not meet the definition of a cell. The method or the invention is preferably practiced using parallel processing at one or more levels. That is, either (i) different regions of the object are subdivided in parallel, (ii) for a given region, interesting slices are scored for different high-priority edges in parallel, (iii) for a given high-priority edge or a given region, interesting slices through that edge are scored in parallel, or a suitable combination thereof.

54 Claims, 12 Drawing Sheets

```
0001    begin parallelism
0002        for each non-cell region r in the subdivision ?
0003            for each high-priority edge e of the region r
0004                for each interesting slice $S_i$ through the edge e
0005                    calculate a score for the slice $S_i$
0006                end
0007            select the one of the slices $S_i$ with the highest score
0008            update the subdivision ? with the selected slice
0009            end
0010        end
0011    end parallelism
```

*FIG. 1*

PARALLEL METHOD FOR SUBDIVISION OF ARBITRARY CURVED SOLIDS

This is a continuation of application Ser. No. 08/119,755 filed on Sep. 10, 1993, now abandoned.

FIELD OF THE INVENTION

The invention generally relates to the field of computer modeling and analysis of physical objects. More specifically, the invention relates to a method for dissecting an object into a representation made of primitive elements.

BACKGROUND OF THE INVENTION

Many computational methods operate over a region of n-dimensional space. For instance, a solid object may be modeled as a digital representation. Finite element analysis is one of many computational applications to which such a model is put.

It has been found that such computational methods are facilitated if the digital representation of the object is made in terms of a set or collection of simple geometric elements. Depending on the number, size, and shape of the elements, and on their configuration relative to each other, an arbitrarily shaped object may be modeled to a desired degree of accuracy.

It has also been found preferable that the elements making up the representation of the object be taken from a set of known elements having predefined simple topologies. For modeling three-dimensional objects, the simplest element is the tetrahedron. Other simple three-dimensional elements include the pentahedron and the hexahedron.

The process of preparing a digital model of an object for use in computations includes decomposing the object into a collection of elements from the set of known elements. It is preferable that the collection of elements fit the object as naturally as possible. The elements fit the object naturally if the boundaries between elements of the collection tend to follow edges of the object, and the sizes of the elements tend to be greater along straight, or otherwise continuous, portions of the object.

It is desirable that the collection of elements fit the object naturally because the dependence of the computational solution on a given subdivision is reduced. The Finite Element method is a computational method commonly used with such element representations of objects. A finite element computation is essentially an interpolation of a function between endpoints made up of the vertices or edges of one of the elements. There are two types of finite element computations, called h-type and p-type.

In h-type finite element analysis, the function is evaluated for a given polynomial order. As a consequence, there is an inherent limitation as to how closely the interpolation can follow the changes in value of the function between two given endpoints. Thus, the accuracy of the interpolated result is inversely related to the distance between the endpoints. Therefore, in an object having more or less intricate sections, where the function is likely to vary more in value in the more intricate sections, a natural subdivision is preferable because the more accurate interpolations are provided where the function is more likely to vary.

In p-type finite element analysis, the accuracy of the interpolated result, for a given element, is related to the polynomial order of the function. Therefore, in p-type finite element analysis, the number of elements of the collection need not be as great as in h-type. Again, a natural subdivision is preferable because a natural subdivision is likely to keep to a minimum the total number of elements, which is desirable to reduce the number of p-type computations.

Therefore, the problem of how to attain a natural subdivision, preferably minimizing the total number of elements, represents an important challenge to those who seek to produce digital representations of objects. One conventional method for producing a natural subdivision is taught in U.S. Pat. No. 4,797,842, issued to Nackman et al. and titled "Method of Generating Finite Elements Using the Symmetric Axis Transform." The Nackman method involves a two-step process in which, first, an object is divided into coarse subdomains, and then the subdomains are further subdivided to produce the final collection of elements. The first step of coarse subdivision is done by using a symmetric axis transform which generates axes symmetric to opposing boundaries of the object, and a radius function of the axes giving the distance between the axes and the boundaries. A coarse subdomain is created between each single non-branching section of the axes and one of the associated boundaries of the object. Then, the coarse subdomains are further subdivided into the elements.

This method is straightforward in two dimensions, because the coarse subdomains are usually in the form of quadrilaterals. In three dimensions, a two-dimensional subdivision is performed on a surface of the three-dimensional coarse subdomains by either mapping points of the surface (which is likely to be warped) to a flat surface or defining geodesics among the warped surface, and then performing the two-dimensional symmetric axis transform using the mapped flat surface or the geodesics to define the symmetric axis. Then, the three-dimensional coarse subdomain is further subdivided, through the use of a further subdivision of the surface in a manner analogous to the further subdivision performed for a two-dimensional object.

However, with arbitrarily shaped three-dimensional solids, the Nackman method produces undesirably large numbers of elements which do not necessarily follow the natural contours of the object in the simplest possible manner. Therefore, the Nackman method is not fully satisfactory.

Other conventional schemes decompose an object by imposing an artificial signature onto the subdivision. That is, they impose a predetermined decomposition pattern on the object.

For instance, in Kela el al., "A Hierarchical Structure for Automatic Meshing and Adaptive FEM Analysis", Production Automation Project, College of Engineering and Applied Science, Univ. of Rochester, published in Engineering Computations, Nov. 1986, there is disclosed a decomposition method including "boxing" the object to define a convenient minimal spatial region, and decomposing the box into quadrants. Each one of the quadrants, which are subdomains of the object, is tested to determine whether it is either wholly inside or wholly outside the object. A subdomain for which neither of these conditions are true is recursively subdivided until one of the conditions is met. A data structure is defined, using a predetermined numbering convention based on the recursive subdivisions, so that a given subdomain is uniquely identified by its number. Thus, a given subdomain may readily be accessed in a data structure through the use of an array index based on its number, rather than by a conventional pointer following method through a tree structure.

While the Kela method has the advantage of speed, because of the recursive quadrant-subdividing scheme, the method imposes the quadrant pattern on the object as the artificial signature. Thus, the resultant collection of elements does not follow the natural shape of the object. Accordingly, this and similar methods also fail to achieve the desired characteristics of a decomposition scheme.

SUMMARY OF THE INVENTION

It is therefore an object of the present invention to provide a method and system for subdividing an arbitrarily curved solid into a mesh of elements from a specified set of elements which follows the contours of the object more naturally than conventional methods, while keeping the total number of elements as low as possible.

To achieve this and other objects, there is provided in accordance with the invention a method for subdividing an arbitrarily shaped object, comprising the steps of calculating a respective score for each of a plurality of respective slices which subdivide the object into regions, and subdividing the object in accordance with one of the respective slices for which the score is optimized.

In a preferred embodiment, the slices which are considered for subdividing the object are selected based on features of the object. An edge is selected, and slices which go through the selected edge are considered. Preferably, the slices under consideration also go through another edge or vertex of the object, or are extensions of, or normal to, faces of the object. It is also preferable that, if the slice goes through another part of the object, that the other part is "visible" from the selected edge, that is, there are no other portions of the object between the selected edge and the other part through which the slice goes.

An object of practicing the invention is to subdivide the object into regions which meet certain predefined criteria. Preferably, the object is to be subdivided into "cells," i.e., regions which have geometric characteristics that fall within a predetermined set of elements. In a preferred embodiment, suitable for use with a finite element analysis system, the set of cells includes tetrahedra, pentahedra, and hexahedra. If an object initially has an arbitrary shape, it is necessary to subdivide the object many times into a large number of regions in order that all of the regions are cells. Thus, the basic method of the invention, considering slices by calculating scores for them, and subdividing in accordance with the slice having the optimal score, is carried out interactively with a test to determine whether there are any non-cell regions remaining. The use of the subdivision score, along with other aspects of the invention relating to selecting slices, advantageously reduces the number of iterations and the total number of resulting cells, relative to other subdivision methods. Also, since the slices are selected based on features of the object, to intersect with edges and vertices of the object or extend existing faces, etc., the resultant subdivision of the object follows the natural shape and contour of the object better than subdivisions produced by conventional methods.

While the invention is primarily disclosed as a method, it will be understood by a person of ordinary skill in the art that an apparatus, such as a conventional data processing system, including a CPU, memory, I/O. program storage, a connecting bus, and other appropriate components, could be programmed or otherwise designed to facilitate the practice of the method of the invention. Such a processor would include appropriate program means executing the method of the invention. In particular, as will be described below, the method of the invention is preferably practiced in a fashion in which certain method steps are executed in parallel. Accordingly, the data processor preferably includes parallel processing architecture, including a plurality parallel processors and a supervisory or scheduling mechanism for controlling and coordinating the parallel processing. Also, an article of manufacture, such as a pre-recorded disk or other similar computer program product, for use with a data processing system, could include a storage medium and program means recorded thereon for directing the data processing system to facilitate the practice of the method of the invention. It will be understood that such apparatus and articles of manufacture also fall within the spirit and scope of the invention.

BRIEF DESCRIPTION OF THE DRAWINGS

FIG. 1 is a pseudocode representation of the method of the invention.

DESCRIPTION OF THE PREFERRED EMBODIMENTS

Figure 2:
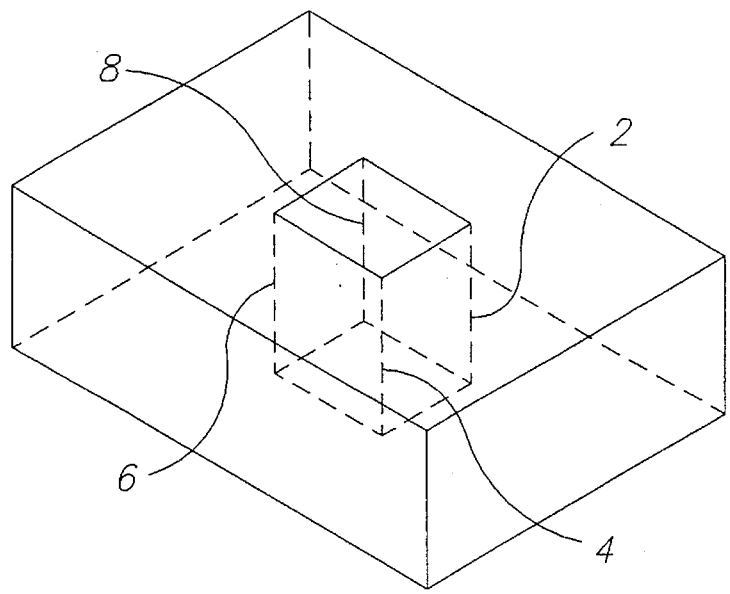
FIG. 2 is a perspective view of a first exemplary object, upon which the method of the invention is to be practiced.

A process for subdividing an object into a collection (i.e., a mesh) of elements incorporating the method of the invention may be summarized as having two steps. In a first step, the geometry of the object is broken up into a set of connected, topologically simple pieces called cells. In the second step, the cells are subdivided, using simple, predefined schemes, into elements which are suitable for a computational method, such as finite element analysis, to which the mesh representation is to be applied. In a preferred implementation of the invention, the term "topologically simple" is used to mean that the set of cells includes tetrahedra, pentahedra, and hexahedra. The method of the invention addresses the first of these two steps.

The method of the invention receives, as an input, a digital representation of the object to be modeled. The input digital representation is defined in terms of vertices, edges, faces, and regions, and is referred to as a subdivision, or, for three dimensional objects, as a 3-D subdivision. Thus, generation of a subdivision of an object, the subdivision possibly including a plurality of regions, may be thought of as a preliminary step executed prior to the first of the two steps discussed above. The discussion which follows will be in terms of a 3-D subdivision, although it will merely be called a "subdivision."

In a preferred embodiment, the method of the invention requires that the input subdivision have certain properties which facilitate the operation of the method. Each region of the subdivision is defined in terms of a set of face surfaces, which enclose the interior of the region. Each face surface is defined as an algebraic surface. That is, each face surface is either (i) planar or (ii) curved in a way describable, in terms of an appropriate coordinate system, by an algebraic expression. Similarly, each edge is an algebraic curve, i.e., is either linear or curved in a way describable, in terms of an appropriate coordinate system, by an algebraic expression. The interior of each region is connected or open, i.e., each face surface is either common with a face of another region, or part of the surface of the object. Also, if two regions of the object intersect, then the intersection is either a common face, a common edge, or a common vertex. If the subdivision has these properties, it is said to be properly joined.

Executing the first step of the process given above produces another subdivision, in which the regions of the input subdivision have been further subdivided into cells. For the purpose of a preferred embodiment of the invention, the term "cell" will now be defined rigorously. A cell has the following three properties: First, the interior of a cell is homeomorphic to a sphere, i.e., it has no holes. Second, a cell has a plurality of faces, each face having three or four edges. That is, a face of a cell is a triangular or quadrilateral surface. Third, the number of faces of a cell, the number of edges of the respective faces of the cell, and the arrangement of commonality of edges between various ones of the faces of the cell, are such that the faces, taken together, are equivalent to the faces of one of a tetrahedron, a pentahedron, and a hexahedron.

It should be understood that the preferred definition of "cell" given here can be interpreted either narrowly, to include only figures which have straight line edges and planar faces, or more broadly, to include figures which are topologically equivalent to tetrahedra, pentahedra, and hexahedra, but which have curved edges and faces. Which interpretation of the preferred definition is preferably to be used depends on whether the object initially has any curved faces or edges. An example of each type of object is given below.

Other definitions of "cell" could also be used in accordance with the invention. For instance, if a set of geometric bodies included other bodies having faces with more than four edges, the second and third ones of the above properties change appropriately. However, for finite element analysis applications, the set of geometric bodies making up cells should preferably be chosen for suitability to the finite element solver to be used. Since the preferred embodiment is to be used in connection with finite element analysis, the above set of bodies making up cells is considered preferable.

In accordance with the method of the invention, regions of the input 3-D subdivision are further subdivided through the use of an operator called a slice. A slice is defined algebraically, for a three dimensional rectangular coordinate system, as follows: $f_1$ and $f_2$ are two faces of a region r of a 3-D subdivision which have a common edge e. The surfaces $f_1$ and $f_2$ are defined algebraically by the respective equations $S_1(x,y,z)=0$ and $S_2(x,y,z)=0$. Any surface through the edge e may then be defined algebraically by the expression $\alpha S_1 + \beta S_2 = 0$, where $\alpha$ and $\beta$ are polynomials in x, y, and z.

There are, of course, an infinite number of surfaces which pass through the edge e. In accordance with the invention, however, only surfaces having certain characteristics are considered for use as slices. These surfaces are referred to as "interesting". The characteristics of interesting surfaces are preferably as follows:

1. The surface is an extension of one of the faces $f_1$ and $f_2$.
2. The surface goes through another edge of the 3-D subdivision, the other edge being visible from the edge e, i.e., the 3-D subdivision not including a region between the edge e and the other edge.
3. The surface is normal to one of the faces $f_1$ and $f_2$, or to another face of the 3-D subdivision which is visible from the edge e.
4. The surface is normal to an edge of the 3-D subdivision which is visible from the edge e.
5. The surface goes through a vertex of the 3-D representation which is visible from the edge e.

For the purpose of the above, the term "visible" is defined rigorously as follows. A face, edge, or vertex is visible from a selected edge if every line segment connecting any point of the selected edge with any point of the face, edge, or vertex lies entirely within the region.

Certain values for the parameters $\alpha$ and $\beta$ define surfaces which satisfy one or more of these conditions. Depending on the polynomial values in x, y, and z of the parameters $\alpha$ and $\beta$, the different surfaces will have various polynomial degrees. A surface which is to be used for a slice of the 3-D subdivision preferably has the lowest possible degree. For straight line edges, such surfaces are preferably planar.

Preferably, a set of faces, edges, and vertices of the 3-D subdivision which is visible from a given edge is derived from a trimmed Delaunay tetrahedrization of the object. See, for instance, U.S. Pat. No. 5,125,038, issued to Meshkat et al., and titled "Face and Edge Trim Method for Automatic Mesh Generation System." This tetrahedrization is preferably obtained during a preprocessing stage, prior to execution of the method of the invention. As the regions are sliced into further subregions (see below), the set of visible faces, edges, and vertices is updated accordingly.

EDGE PRIORITY

In accordance with the invention, each edge of a region is assigned a priority. While each edge can be used to define surfaces for slices, edges are considered for use as slices according to their priority. The exact form or formula for determining priority is not essential to the invention, but the following criteria are preferably observed:

First, an edge has a high priority if the two faces meeting at the edge have a large interior angle. The term "large" is preferably defined in terms of a threshold value. Thus, an angle will be treated as "large" if it exceeds that threshold angle, i.e., if the angle falls within a predetermined range of values. The interior angle can, for instance, exceed 180°, in which case the edge runs along the inside of a concavity in the region or object.

Second, an edge has a high priority if one or both of the faces sharing the edge have large curvatures. With regard to curvatures, the term "large" is preferably defined in terms of a measurable parameter. A preferred parameter is the radius of curvature: the smaller the radius, the greater the curvature. For an algebraic curve parameters such as the radius of curvature may be determined analytically, given the algebraic expression which defines the curve. Then, to determine the "largeness" if the curvature, the parameter is evaluated relative to the overall size of the object. For instance, if the size of the object is given in terms of a longest line segment whose endpoints are within the object or on its surface, then the curvature can be measured in terms of the radius, relative to that line segment. Curvature would then be considered "large" if the ratio of the radius to the longest segment fell below a threshold value, or within a predetermined range of values bounded by the threshold value.

Third, an edge has a high priority if the edge is long, relative to other edges or to the overall size of the object. It is straightforward to determine whether the ratio of the length of the edge to the length of other edges or the longest segment falls within a predetermined range of values. Again, this is preferably determined by comparing the ratio with a predetermined threshold value.

SUBDIVISION SCORE

A given subdivision has a score associated with it. The score is based on a number of criteria. According to a preferred embodiment of the invention, there will now be given ways of quantifying the various criteria that make up the score, and a formula for the overall score based on the quantified criteria.

In general, the score for a subdivision should follow the following principles: First, the score is related to the ratio of the number of cells C in the subdivision to the total number of regions R in the subdivision, and preferably should be high when the number of cells C is high, relative to the total number of regions R.

Second, the score is related to the ratio of the number of faces Q, which are quadrilateral, relative to the total number of faces F of the subdivision, and preferably should be high when the number of faces Q is high, relative to the total number of faces F.

This second relation may be more broadly stated that the score is related to the number of faces whose topologies match the topologies of faces of the cells, relative to the total number of faces. It will be seen that, in the case where pentahedrons and hexahedrons are cells, these two types of cells have triangular and quadrilateral faces. Therefore, the face ratio in this case is the ratio of triangles and quadrilaterals to total faces.

However, the preferred embodiment counts the number of quadrilateral faces, rather than the number of quadrilateral or triangular faces. This is because one objective in practicing the invention is to keep to a minimum the number of cells produced. For a given object, it might be possible to have either a first subdivision including a hexahedron, or a second subdivision in which several tetrahedra take the place of the hexahedron. In the first subdivision, the hexahedron has six quadrilateral faces. In the second subdivision, the tetrahedra have four triangular faces each, totalling more than six faces. The first subdivision is considered preferable, because the number of cells is smaller. Therefore, to facilitate treating the first subdivision as preferable, only quadrilateral faces are counted.

It is a noteworthy aspect of the invention that it is applicable to objects having curved, as well as planar, surfaces and slices. For the purpose of the invention, faces are regarded as topologically equivalent, and treated in the same manner, if they have the same number of edges and vertices. This is true regardless of whether the faces are planar or curved. Also, regions are regarded as topologically equivalent, and treated in the same manner, if there is a correspondence between faces and edges of the regions, the corresponding faces having the same numbers of edges, and corresponding pairs of the faces being joined by corresponding edges. Again, this is true regardless of whether the faces or edges are curved. As will be seen, scores for subdivisions are calculated based on the number of faces and regions. Faces and regions are counted the same way, regardless of whether they are curved. Therefore, a score for a subdivision including curved faces or regions is calculated the same way as if all faces were planar. Thus the invention has advantageous applicability to objects having curved surfaces. An example of the way in which the method of the invention is practiced on an object having curved surfaces is given below.

Third, the score is related to the respective shapes of the faces of the subdivision, and preferably should be high when (i) all or most of the faces are "well shaped," and (ii) the number of "poorly shaped" faces is low, relative to the total number of faces F of the subdivision.

Fourth, the score is related to the respective shapes of the regions of the subdivision, and preferably should be high when (i) all or most of the regions are "well shaped," and (ii) the number of "poorly shaped" regions is low, relative to the total number of regions of the subdivision.

"Poorly shaped" faces and regions have elongations, concavities, or other features which deviate from regularity. There are various ways of qualifying the shape of a face or a region as being "poor" or not, including various suitable mathematical formulas which would be known to a person skilled in the mathematical or geometric arts. In a preferred embodiment, given below, algebraic expressions are given for quantifying the shape of faces and regions. Thus. "poorly shaped" faces and regions have lower shape values than "well shaped" faces and regions do.

Certain characteristics of faces and regions change in a quantifiable fashion as the shape becomes better or poorer. For instance, a regular polygon, in which the edges are of equal length and the angles between adjacent edges are all the same, is preferably regarded as the best-shaped polygon (of a given number of edges). Also, such a regular polygon has the greatest area of all polygons having tire same number of edges and the same perimeter.

As the shape of this polygon becomes poorer, several characteristics change. First, assuming the perimeter is held constant, the area decreases. Thus, a ratio of the decreased area to the area of a regular polygon of the same perimeter, or some other suitable value related to the decreased area, may be used as a measure of the "poorness" of the shape of the polygon. Second, the angles between adjacent edges change. For a planar polygon of a given number of edges, the total of all the angles between adjacent edges is the same, so some angles may increase and some decrease. Thus, a. maximum or minimum angle may be used as a measure of the "poorness" of the shape.

With this in mind, according to a preferred embodiment of the invention, scores are calculated using the following formulas: The shape $\sigma_f(f)$ of a face f having area A and perimeter p is given as follows:

$$\sigma_f(f) = \frac{A}{4\pi p^2} \quad (1)$$

This formula is based on a ratio of areas. From this formula, it will be seen that the highest possible value for equation (1), corresponds with the "best" possible shape for the face.

However, it is not essential to the operation of the invention that any particular formula, normalizing factor, or resultant numerical value be used. Since, as will be described, scores for slices and subdivisions are evaluated relative to each other, whichever formula is to be used needs only to be applied consistently for all of the regions produced by a given subdivision of the object.

The shape $\sigma_r(r)$ of a region r having surface area A and volume V is given as follows:

$$\sigma_r(r) = \frac{V^2}{36\pi A^3} \quad (2)$$

This formula, likewise, is based on a ratio of volumes. From this formula, it will be seen that the highest possible value for equation (2), corresponds with the "best" possible shape.

These formulas may be used for subdivisions having curved, as well as planar, surfaces and slices. Since the area of a curved algebraic surface, or the volume of a region having one or more algebraically curved faces, may readily be calculated using the calculus, Formulas based on areas and volumes need not be modified to allure, for curvature.

By contrast, formulas which depend on other factors such as the angles between adjacent edges of a curved face may have to be modified to allow for the curvature. For instance, in a "polygonal" face on a negatively curved (saddle-shaped) surface, the total of the angles is less than the total for a planar face. On the other hand, a "polygonal" face on a positively curved surface (such as a portion of a spherical or ellipsoidal surface) has angles which total up to more than the total for a planar face. While an angle-based formula can be used, taking this curvature and these angle totals into account, to quantify the shape of the face, it is considered preferable to use area- and volume-based formulas, such as those given above which need not take the curvature into account.

DESCRIPTION OF A PSEUDOCODE IMPLEMENTATION OF THE METHOD OF THE INVENTION

Scores are calculated over subdivisions, based on pluralities of faces and regions, as well as the cells C and quadrilateral faces Q. As discussed above, while the set of cells employed in the preferred embodiment of the invention includes bodies having, triangular and quadrilateral faces, minimization of the number of cells for a subdivision of a given object is likely in coincide with a maximization of the number of faces which are quadrilateral, rather than triangular. Therefore, the preferred score formula produces a value directly related to the number of quadrilateral faces.

In a preferred embodiment of the invention, a score "s" for a subdivision is calculated according to the following formula:

$$s = \frac{(C+1)(Q+1)\overline{\sigma_f}\overline{\sigma_r}}{(R+1)(F+1)} \quad (3)$$

where C, Q, R, and F are as defined above, and $\overline{\sigma_f}$ and $\overline{\sigma_r}$ are the averages of the shape values given by equations (1) and (2) for all the faces and regions, respectively, of the subdivision.

When a slice is made for a subdivision, the slice defines new regions, faces, edges, and vertices by intersecting with, and thereby dividing, the previously existing regions, faces, and/or edges. As a consequence, the calculation of the score s as per equation (3) produces a new (and presumably larger) value after the slice is made. Therefore, further in accordance with the invention, a score is determined for the slice based on the subdivision scores before and after the slice is made. In a preferred embodiment, the slice score is the ratio of the subdivision scores after and before the slice is made.

Given the preceding discussion, it will now be understood that the method of the invention, which subdivides regions of a subdivision into cells, operates by using the slicing and scoring techniques just. described in order to achieve two objectives.

The first objective is to maximize the likelihood that a slice divides a region into smaller regions including at least, one cell. As previously described, a cell is a connected set of simple geometric elements, the shape being one of those shapes which are easily computable by finite element analysis algorithms, e.g., hexahedra, pentahedra, and tetrahedra. From the foregoing explanation it will be understood that a slice which is "interesting," i.e., which has one of the properties listed above, has a greater likelihood, relative to a random slice, of producing a cell.

By contrast, if random slices were made, the slices would intersect faces or edges at random locations, thus increasing the number of artifacts, i.e., introducing new vertices, edges, and faces that did not exist in the original object. For applications such as finite analysis, sufficient additional subdivisions would be necessary to resolve all of these new artifacts into cells. Therefore, the number of cells would be disadvantageously increased.

The second objective is to have a high likelihood of following the natural shape of the object in doing so. Because high priority edges are selected preferentially for slicing, and interesting slices (i.e., slices having relationships with the topological features of the object) are used, the set of cells produced by the slicing process tend to follow the natural contour of the object.

The method of the invention is practiced on a subdivision which includes at least one region which does not fit the definition of cell. FIG. 1 is a pseudocode representation of a computer implementation of the method according to the invention.

Lines 0002 through 0010 form a for loop which describes what processing is carried out, in parallel or otherwise, for each non-cell region of the subdivision. For each of these regions, there are one or more edges, some of which qualify as high priority according to criteria such as those given above, for which processing is executed according to the for loop of lines 0003 through 0009.

For each one of these high priority edges, there are one or more surfaces which qualify as interesting, according to criteria such as those given above. For each of these interesting slices, a slice score is calculated in steps 0004 through 0006.

A slice intersects the interior of a non-cell region of the subdivision. The slice produces boundary edges through faces of the non-cell region, thereby producing new regions subdivided from the non-cell region, having a shared face defined by the slice, and having edges defined by the intersection of the slice and the faces of the non-cell region.

A slice terminates at the boundary edges, and is therefore local to the nan-cell region. However, a slice may affect adjacent regions by imposing new edges on the boundaries of the adjacent regions, i.e., new edges running across faces of the adjacent regions. In order that the subdivision, as a whole, should continue to meet the conditions for being properly joined, the imposed new edges become part of the adjacent regions. It is therefore possible that an adjacent region, which had been a cell, could no longer be a cell after the new edge is imposed.

In step 0007, the slice having the highest score is selected. The subdivision is then updated with the selected score in step 0008. This update of the subdivision includes subdividing the region through which the selected slice cuts. The subdivision of that region results in either cells, or in one or more non-cell regions. In the latter case, processing as per steps 0002 through 0010 continues, until no non-cell regions are left.

A noteworthy feature of the method of the invention is that, at several levels, parallel processing can be employed. First, different regions can be processed simultaneously. Within a given region, different high-priority edges can be processed simultaneously. For a given high-priority edge, different interesting slices can be processed simultaneously. For each of these levels of parallelism, the appropriate calculations described above are preferably made simultaneously. That is, the operations in the FOR loops in lines 0002, 0003, and/or 0004 are executed simultaneously by parallel processing, rather than in series by a single processor. Then, based on the results of each of the parallel calculations, selecting the highest scoring slice updating the region with the selected slice, etc. is made with advantageous speed.

The pseudocode given in FIG. 1 shows an example of the method of the invention employing one level of parallelism. The outermost loop, lines 0001 and 0011, refer to parallelism, indicating that, given appropriate processing resources, the processing in steps 0001 through 0010 is carried out in parallel for different ones of the various non-cell regions of the subdivision. As a consequence, the different regions are subdivided substantially simultaneously.

Other levels of parallelism are implemented in the method of the invention by inserting similar pairs of BEGIN and END PARALLELISM statements at appropriate points in the pseudocode of FIG. 1. For instance, if the method is to be practiced by operating on the different high-priority edges of a given region in parallel, then a BEGIN statement is inserted between lines 0002 and 0003, and an END statement is inserted between lines 0009 and 0010. Similarly, if different interesting slices through a given high priority edge of a given one of the regions are to be evaluated in parallel, then a BEGIN statement is inserted between lines 0003 and 0004, and an END statement is inserted between lines 0006 and 0007.

As described above, at each level, the method of the invention determines which choice is optimal, i.e., which interesting slice through a given edge, or which high-priority edge, or which region, produces the highest-scoring subdivision. Sometimes, however, if a given choice is made at one of the levels, and the method proceeds to select a series of subsequent slices, the final result may not be the best possible overall subdivision score. Thus, the method of the invention may also be practiced using "backtracking", wherein previously selected slices are nullified, an alternative slice is selected, and the method proceeds from that alternative slice. In some cases, a better final score may result.

EXAMPLES

A description of how the method of the invention operates upon two exemplary objects will now be given. Since the discussion which follows involves slicing the objects, hidden lines will be used as necessary to illustrate the edges of the objects, visible or otherwise, along which slices are taken. In accordance with the invention, the objects will be subdivided by focusing on one high priority edge all a time, considering a set of possible slices for each edge, and selecting one of the possible slices from the set to be added to the subdivision.

As per the above discussion, according to the invention, preferred quantitative methods are used for calculating parameters such as (i) which edges are high priority, (it) which slices are interesting, (iii) face and region shapes, and (iv) subdivision scores. For the sake of simplicity of explanation for the two examples which follow, the calculations, and the values of the parameters on which the calculations are based, are omitted. Instead, there will be provided qualitative descriptions which show how the parameters would be obtained, and what the results of the calculations would look like. It is believed that this explanation will enhance the reader's understanding of the two examples of the method of the invention, while still enabling a person skilled in the art to perform the method of the invention by applying the calculations described above.

First Example

The first object, a rectangular prism having a rectangular prism-shaped hole through it, is shown in FIG. 2. Initially, the object of FIG. 2 has only one region, taking up the entire object. Referring to the preferred definition of cell given above, the region is not a cell, because it has a hole, has surfaces (lap and bottom) which are not triangular or quadrilateral, and is not topologically equivalent to a pentahedron or hexahedron. Since the first object has no curved edges or faces, an alternative, narrower, definition of "cell" may be employed, in which cells have only straight line edges and planar surfaces.

Figure 3:
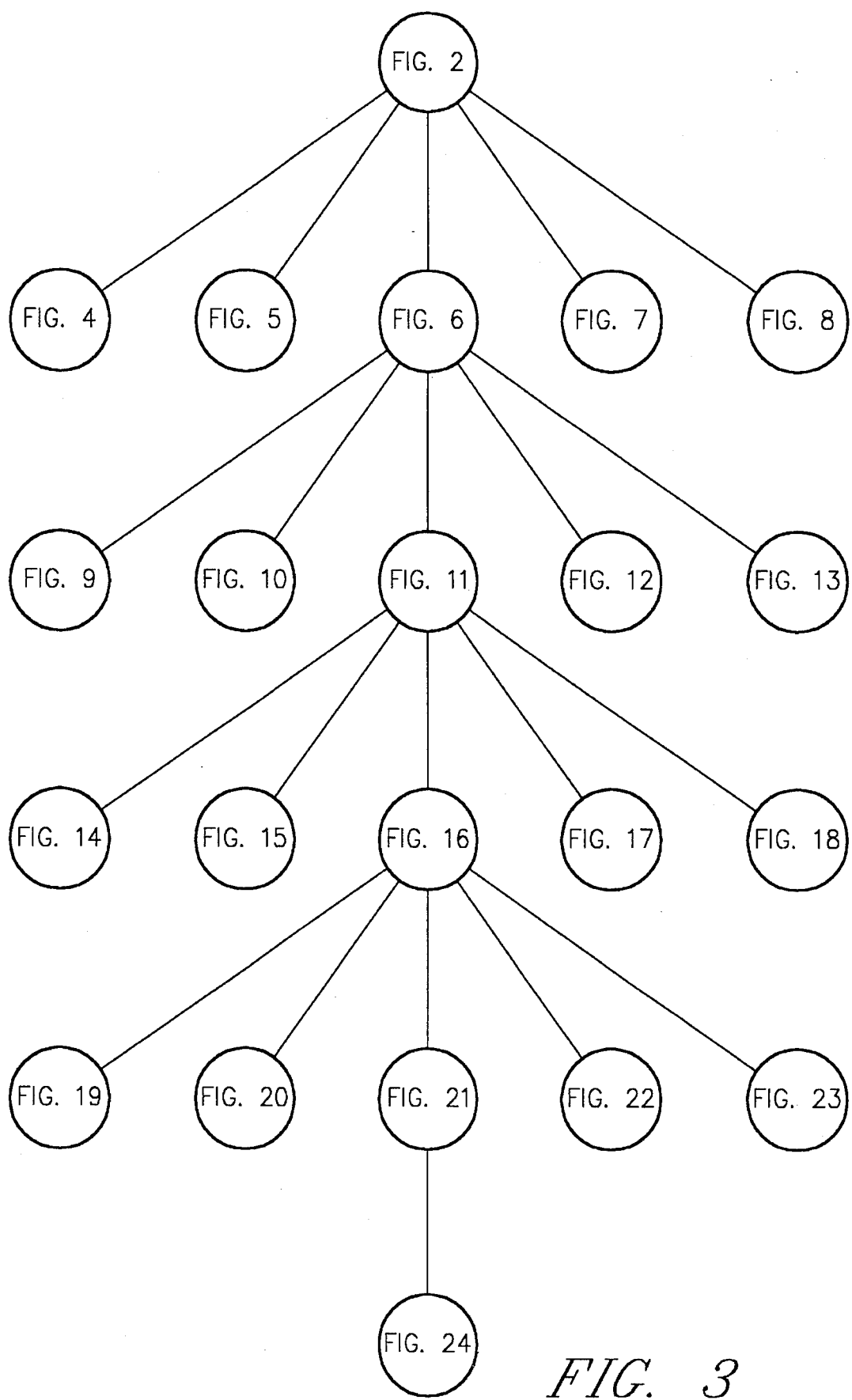
FIG. 3 is a tree representation of the subdivision of the first object of FIG. 2 into cells according to the method of the invention, each node of the tree corresponding with a respective one of FIG. 2, FIGS. 4 through 23, and FIG. 24.

FIG. 3 is a tree representation of the method of the invention as it will be practiced on the first object. The tree is analogous to a flowchart, having nodes representing steps of the method. Each node of FIG. 3 corresponds with one of FIGS. 2 and 4–24, FIG. 2 being a starting point and FIG. 24 being the conclusion of the method. FIGS. 4 through 23 show various intermediate subdivisions of the object, and various slices which are being considered For addition to the subdivision.

In FIG. 3, each level in the tree, including horizontally aligned aligned nodes, corresponds with a given intermediate stage, in which a high priority edge has been selected, and various interesting slices through the selected edge are shown in the various nodes. One of the interesting slices is selected. The node corresponding with the selected slice has a branch going downward from it, leading to another group of horizontally aligned nodes representing the next high priority edge, and the set of possible slices through that edge.

Figure 4:
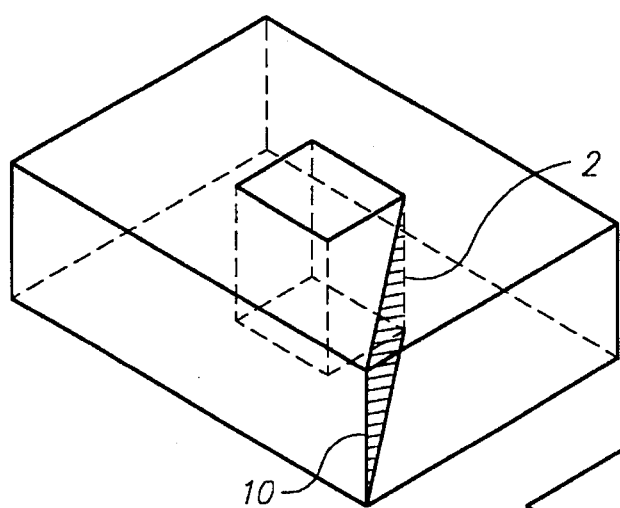
FIGS. 4 through 23 are perspective illustrations of the first object of FIG. 2, showing slices through regions of the first object, as per the various steps of the method of the invention.
Figure 5:
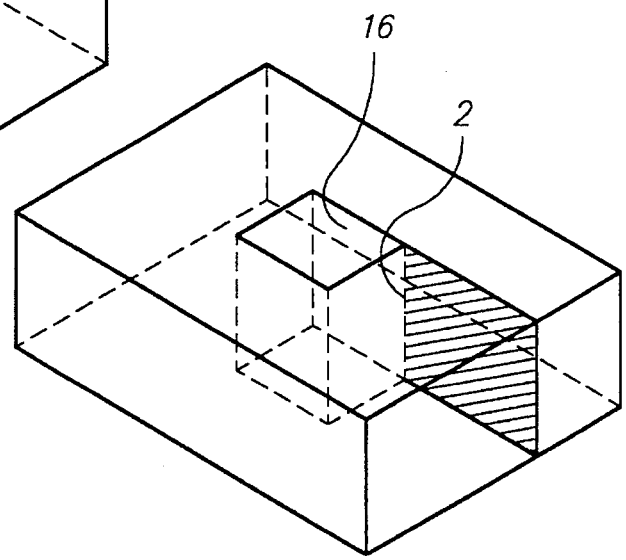
Figure 6:
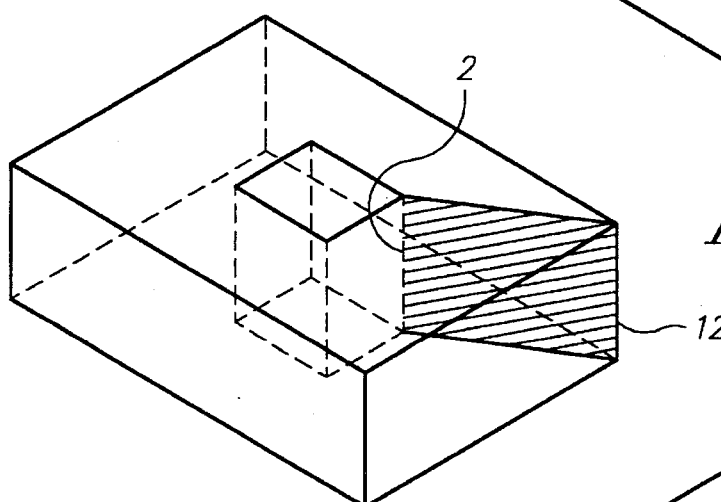
Figure 7:
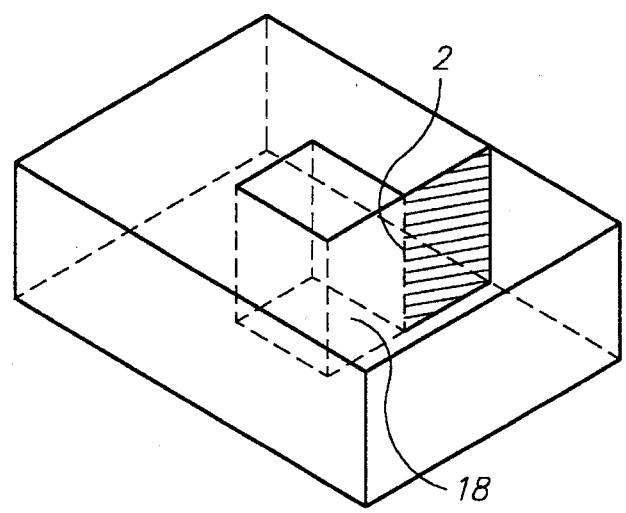
Figure 8:
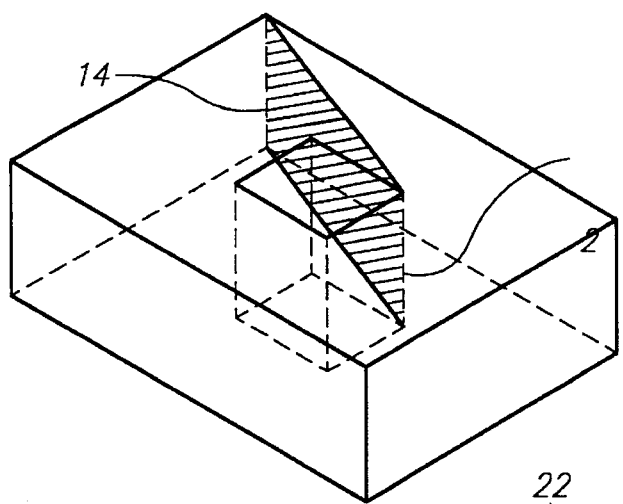

Let us consider first the object of FIG. 2, which is shown as the uppermost (i.e., root) node of FIG. 3. To begin with, interior edges 2, 4, 6, and 8 of the hole are high priority, by virtue of being interior edges inside a concavity of the object, specifically inside the hole. The edge 2 is selected, and five interesting slices which include the edge 2 are shown in FIGS. 4, 5, 6, 7, and 8. The slices in FIGS. 4, 6, and 8 are interesting because they intersect respective outer vertical edges 10, 12, and 14 of the object. The slices in FIGS. 5 and 7 are interesting because they are coplanar extensions of respective interior surfaces 16 and 18 of the hole.

The interesting slice shown in FIG. 6, intersecting the edges 2 and 12, is selected as having the highest score. While there is still only one region, the region no longer has a hole. Rather, the region has two faces, produced by the slice, which abut each other. The two newly added faces are both relatively well shaped. Because of these factors, the subdivision score increases.

The next group of slices, shown in FIGS. 9, 10, 11, 12, and 13, are represented by nodes which branch off from the node of FIG. 6 in FIG. 3. The drawings of the object in FIGS. 9–13 all show the slice of FIG. 6 as now being part of the subdivision of the object.

Figure 9:
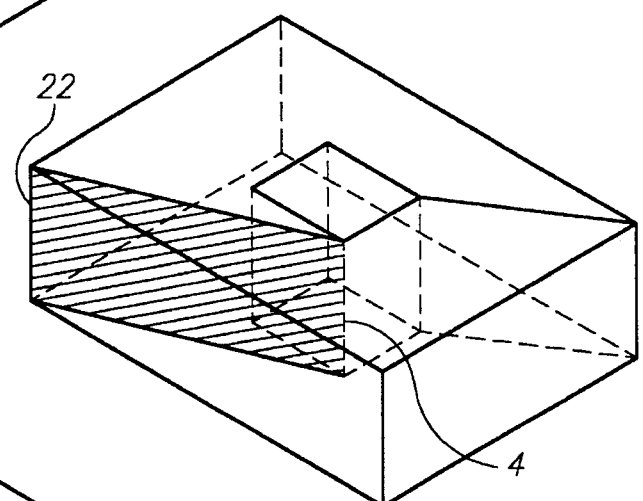
Figure 10:
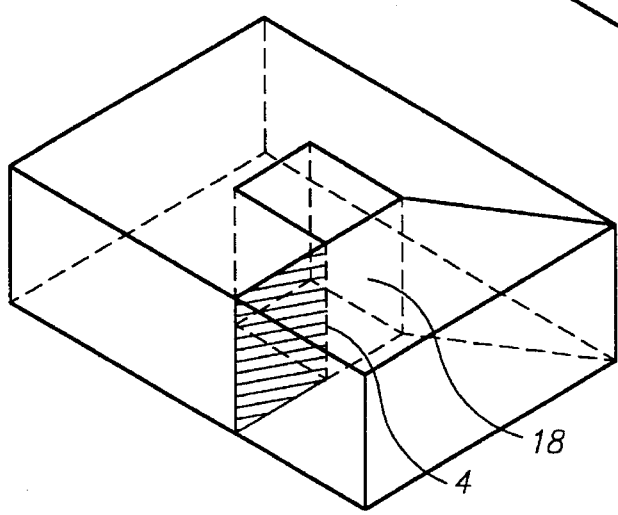
Figure 11:
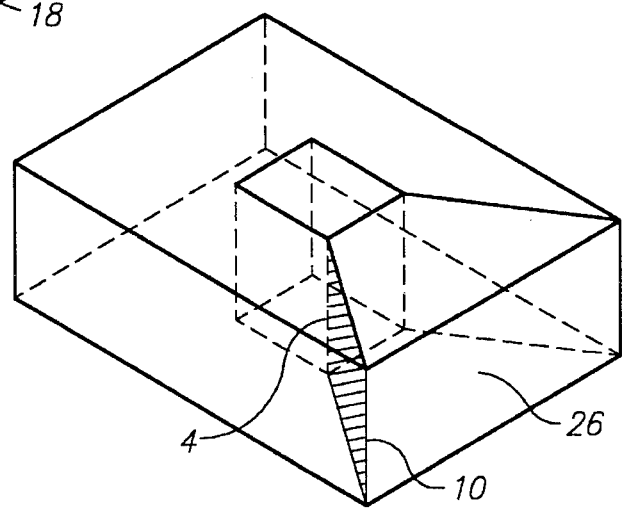
Figure 12:
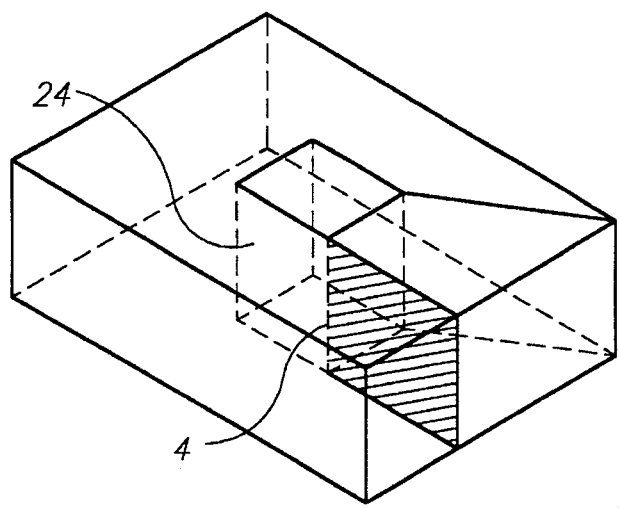
Figure 13:
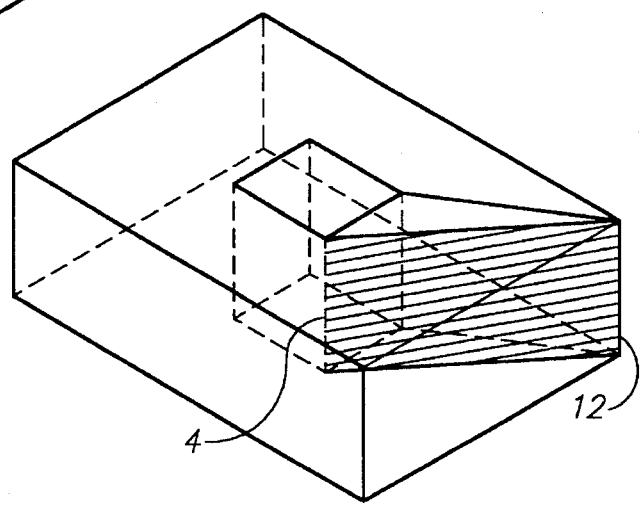

In FIGS. 9–13, the edge 4 is selected as the next high priority edge, and five interesting slices through edge 4 are shown. In FIGS. 9, 11, and 13, the slices also go through an edge 22 and the edges 10 and 12, respectively. In FIGS. 10 and 12, the slices are coplanar extensions of the face 18 and a face 24 of the hole, respectively.

The interesting slice shown in FIG. 11, intersecting the edges 4 and 10, is selected as having the highest score. The object has now been subdivided into two regions, one of which being a hexahedral cell 26. Thus, the ratio of cells to regions goes up, as does the triangular/quadrilateral face-to-total face ratio. Accordingly, the subdivision score goes up again.

The next group of slices, shown in FIGS. 14, 15, 16, 17, and 18, are represented by nodes which branch off from the node of FIG. 11 in FIG. 3. The drawings of the object in FIGS. 14–18 all show the slice of FIG. 11 as also now being part of the subdivision of the object.

Figure 14:
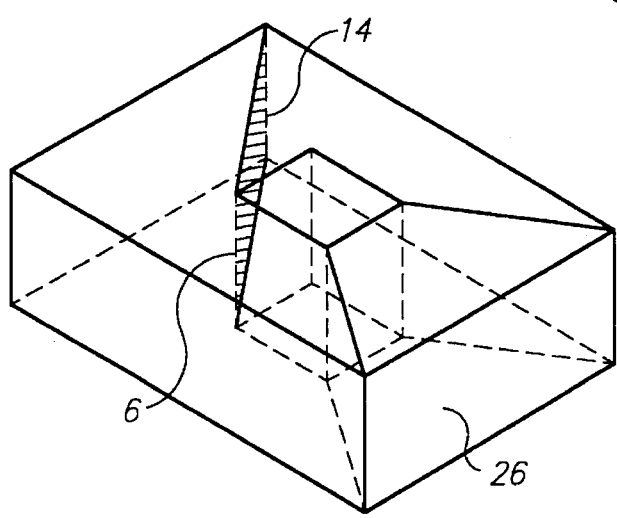
Figure 15:
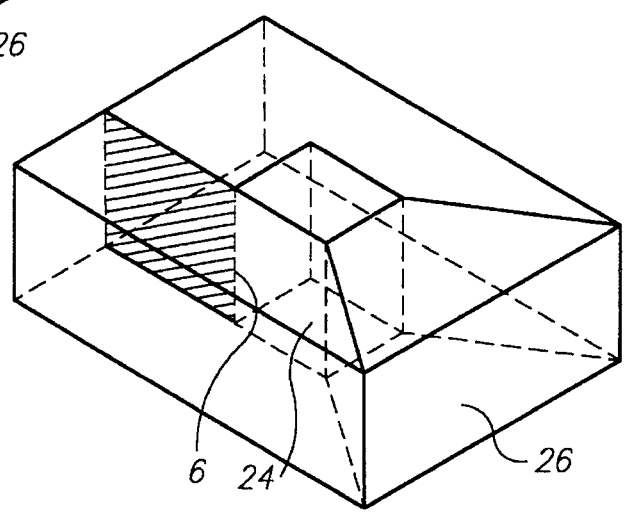
Figure 16:
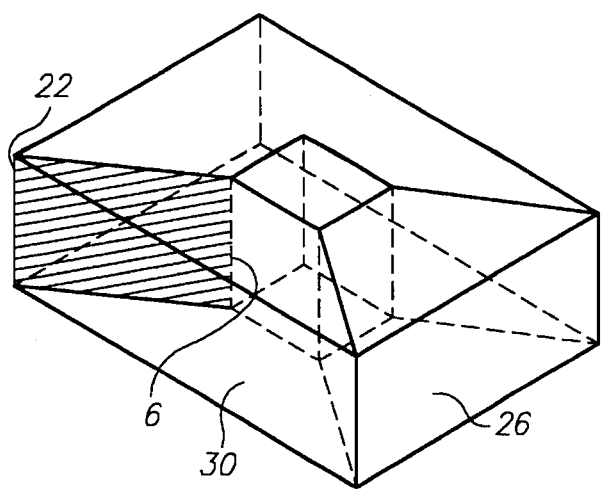
Figure 17:
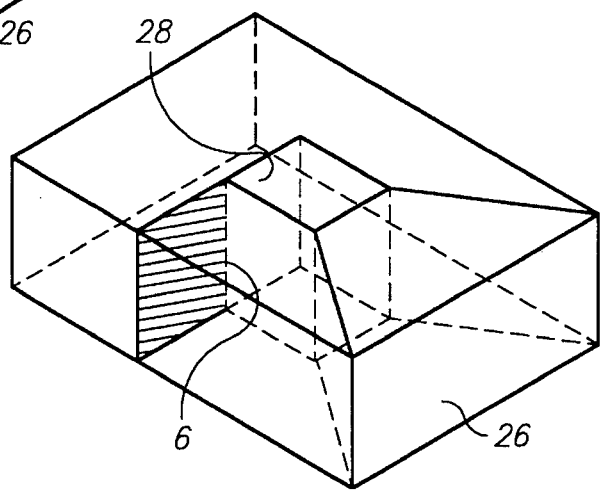
Figure 18:
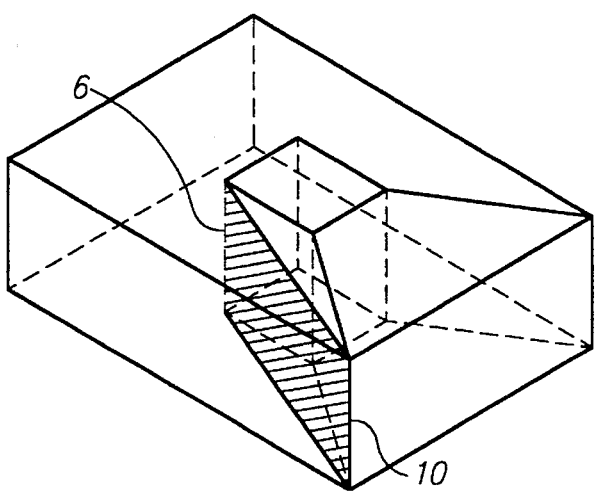

In FIGS. 14–18, the edge 6 is selected as the next high priority edge, and five interesting slices through the edge 6 are shown. In FIGS. 14, 16, and 18, the slices also go through the edge 14 and the edges 22 and 10, respectively. In FIGS. 15 and 17, the slices are coplanar extensions of the face 24 and a face 28 of the hole, respectively.

The interesting slice shown in FIG. 16, intersecting the edges 6 and 22, is selected as having the highest score. There are now three regions, including, a newly created hexahedral cell 30. The cell-to-region and the face ratios both increase, and the shape of the non-cell region and its top and bottom faces continue to improve. All of these factors increase the subdivision score.

The next group of slices, shown in FIGS. 19, 20, 21, 22, and 23, are represented by nodes which branch off from the node of FIG. 16 in FIG. 3. The drawings of the object in FIGS. 19–23 all show the slice of FIG. 16 as also now being part of the subdivision of the object.

Figure 19:
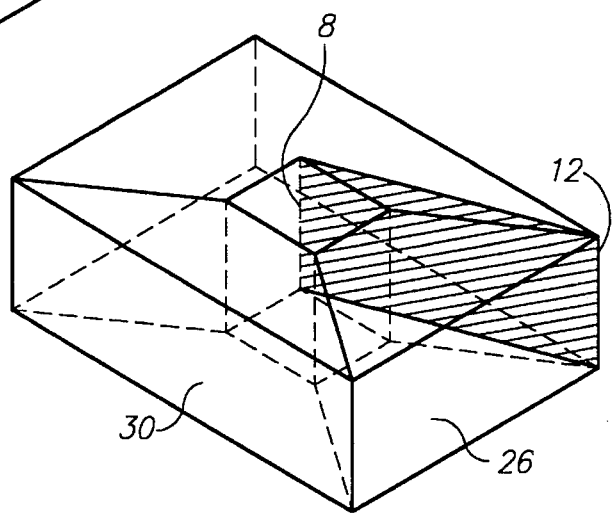
Figure 20:
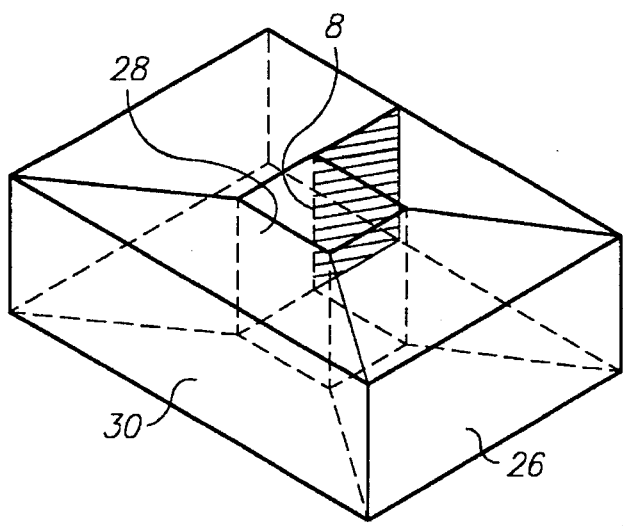
Figure 21:
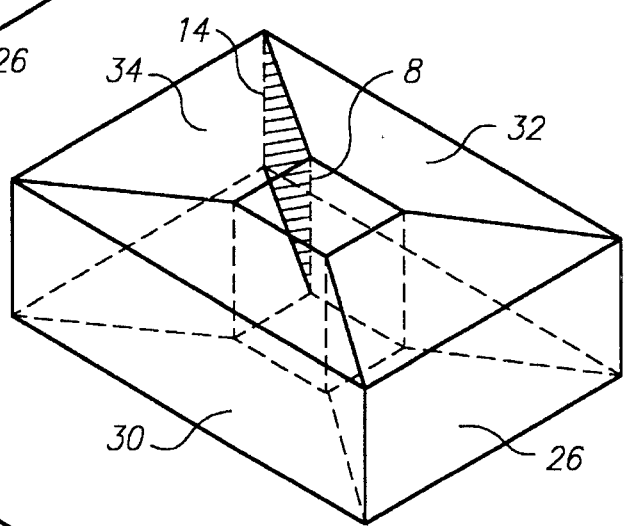
Figure 22:
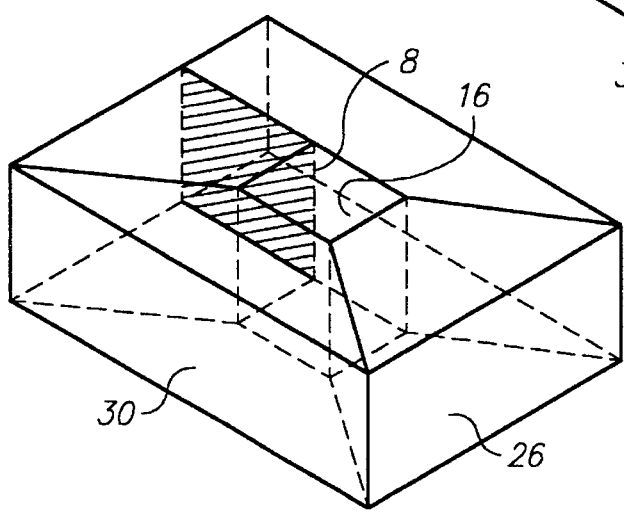
Figure 23:
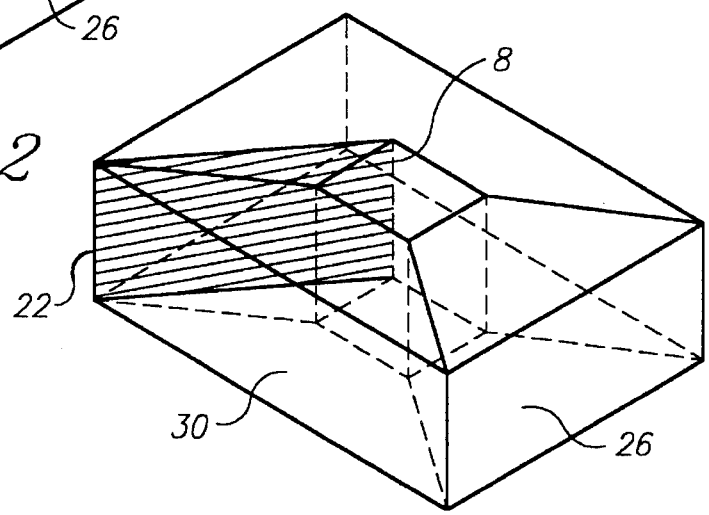

In FIGS. 19–23 the edge 8 is selected as the next high priority edge, and five interesting slices through the edge 8 are shown. In FIGS. 19, 21, and 23, the slices also go through the edges 12, 14 and 22, respectively. In FIGS. 20 and 22, the slices are coplanar extensions of the faces 28 and 16 of the hole, respectively.

Figure 24:
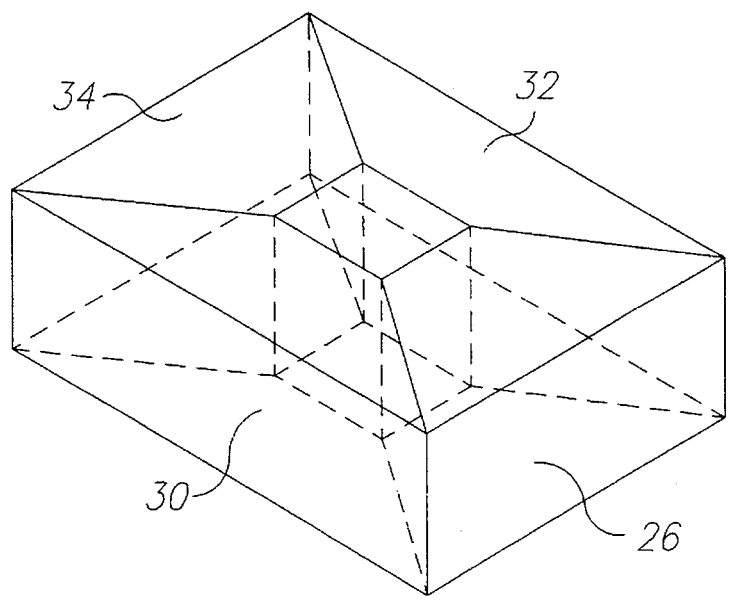
FIG. 24 is a perspective illustration of the first object of FIG. 2, showing the first object decomposed into cells, as per the completion of the method of the invention.

The interesting slice shown in FIG. 21, intersecting the edges 8 and 14. is selected as having the highest score. There are now four regions, all of which are cells. The non-cell region as now been divided into two hexahedral cells 32 and 34. All of the faces are quadrilateral, and all of the faces and regions are well shaped. Therefore, the subdivision score has further increased. The drawing of the object in FIG. 24 show the slice of FIG. 21 as also now being part of the subdivision of the object.

At this point there are no longer any regions of the object which are not cells. Therefore. FIG. 24 represents the conclusion of the method of the invention, in which the object has been decomposed into four cells 26, 30, 32, and 34. Each of these four cells is a hexahedron, or "brick." Therefore, the second of the two process steps is then executed to further decompose the hexahedra produced by the method of the invention into tetrahedra.

Second Example

Figure 25:
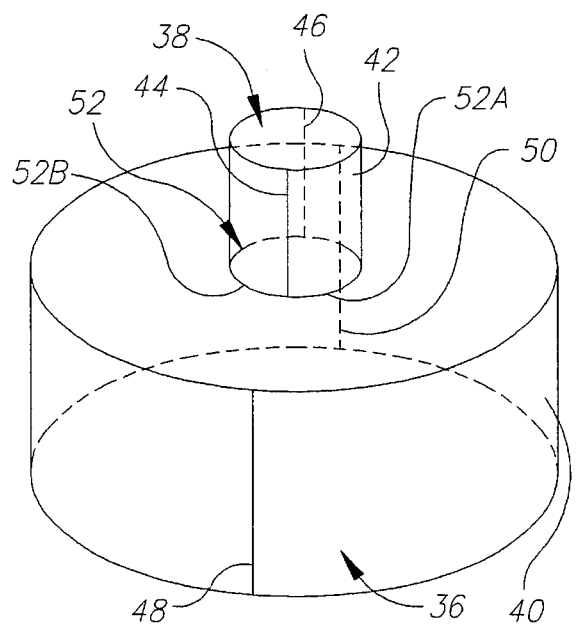
FIG. 25 is a perspective view of a second exemplary object, upon which the method of the invention is to be practiced.

A second object will now be subdivided according to the method of the invention. The second object is shown in FIG. 25. The second object is cylindrical, having a lower portion 36 which has a first diameter, and an upper. coaxial, portion 38 which has a second, smaller, diameter. Because the second object has curved surfaces, the definition of "cell? is appropriately expanded to include regions which have convex curved surfaces, i.e., algebraic surfaces, as well as planar faces. Otherwise, the rigorous definition of "cell" given above also applies to the object of FIG. 25.

Initially, the second object is represented by a single region. Surfaces 40 and 42, which go around the perimeters of the two cylindrical portions 36 and 38, respectively, are initially divided into curved quadrilaterals through the addition of edges 44, 46, 48, and 50. The curved quadrilaterals also include edges made up of respective "halves" of the circular edges, such as the semicircular edges 52A and 52B, which are bounded by endpoints of the edges 44 and 46.

Next a first high priority edge is selected. The selected edge is an edge 52, including the edges 52A and 52B, running around the face of contact. between the cylindrical portions 36 and 38. The edge 52 is selected because it is an interior edge on a concavity of the object, specifically the base of the cylindrical portion 38, which is a concavity between the portion 38 and the upper face of the portion 36.

Figure 27:
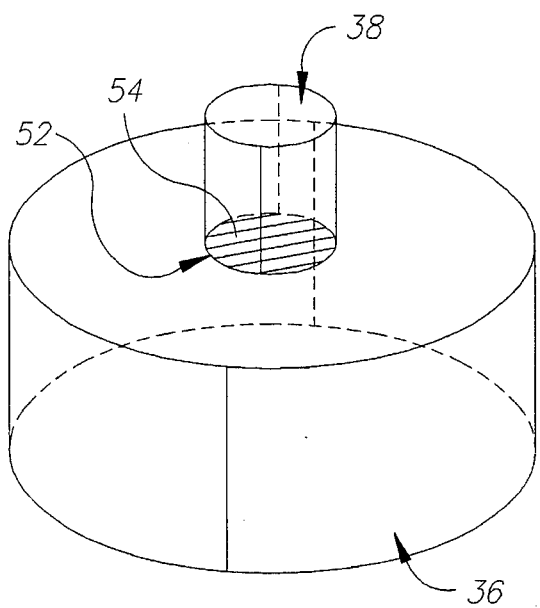
FIGS. 27 through 36 are perspective illustrations of the second object of FIG. 25, showing slices through regions of the second object, as per the various steps of the method of the invention.
Figure 28:
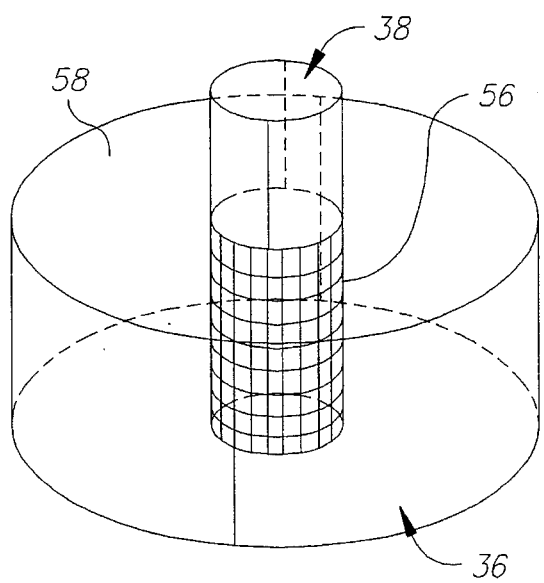
Figure 29:
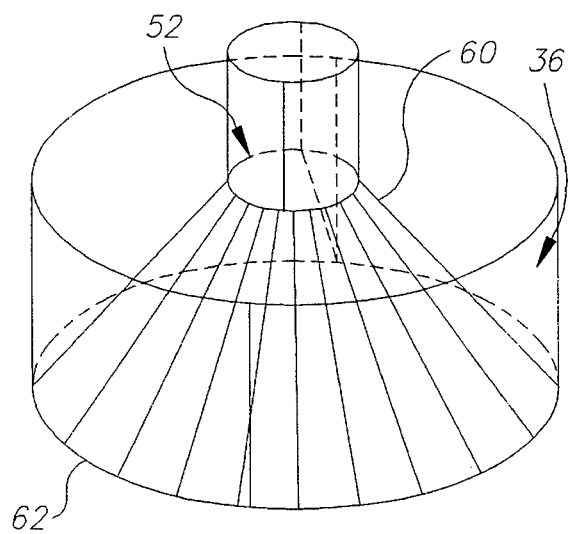
Figure 26:
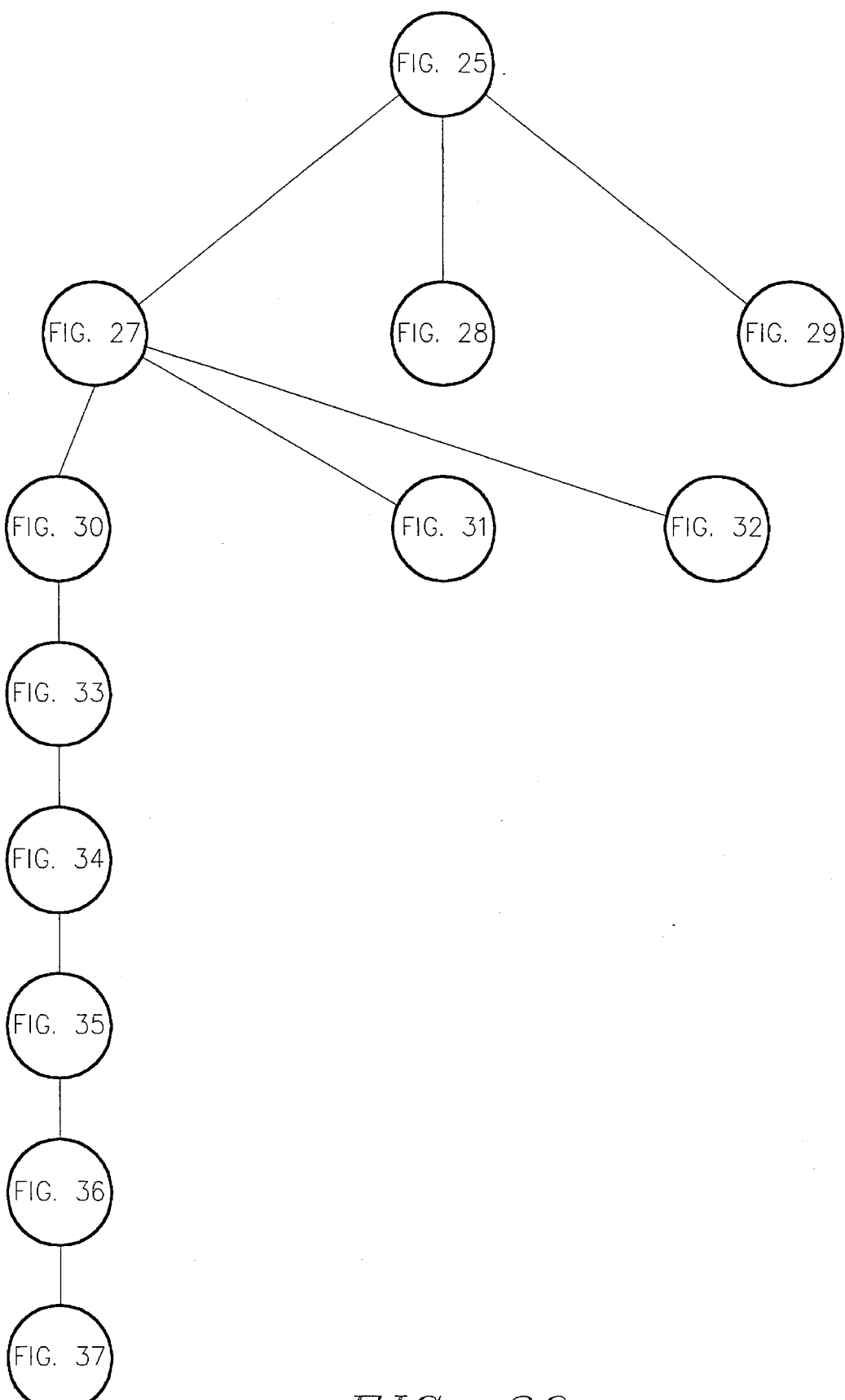
FIG. 26 is a tree representation of the subdivision of the second object of FIG. 25 into cells according to the method of the invention, each node of the tree corresponding with a respective one of FIG. 25, FIGS. 27 through 36, and FIG. 37.

Three interesting slices which go through the edge 52 are shown in FIGS. 27–29. In FIG. 27, a planar slice 54 divides the two cylindrical portions 36 and 38 where they contact each other. In FIG. 28, the outer perimeter of the portion 38 is extended vertically through the portion 36. This slice would produce a cylinder 56 having the diameter of the cylindrical portion 38 and an altitude equal to the sum of the altitudes of the two cylindrical portions. The remainder or the portion 36 would be an annulus, or "doughnut," 58. In FIG. 29, a conical slice 60 runs from the edge 52, moving downward and increasing in diameter, to intersect with a lower perimeter 62 of the lower cylindrical portion 36.

From these three possible slices, the slice of FIG. 27 is selected. The upper portion 38 is now a separate region which falls within the expanded definition or cell. If the slice or FIG. 28 had been selected, the cylindrical region 56 might then have had an altitude great enough, relative to its diameter, that the resultant cell would be poorly shaped. Moreover, the slice would have produced the annulus 58, which would be a more poorly shaped non-cell region. The slice of FIG. 29 would have produced two poorly shaped, non-cell regions. Therefore, the score for the subdivision of FIG. 27 would have been the highest of the three scores.

After the slice of FIG. 27 is made, the lower portion 36 is not a cell. This is because, even though it has the same cylindrical shape as the upper portion 38, the lower portion 36 still has the edge 52 in its upper face. The edge 52 divides the upper face into a circular interior face and an annular exterior face. The exterior face is not topologically equivalent to any face of any of the defined cells, so the lower portion 36 fails to meet the definition of cell. Therefore, the lower portion 36 will be further subdivided, using the edge 52, which is high priority because it has an interior angle of 180°.

Figure 30:
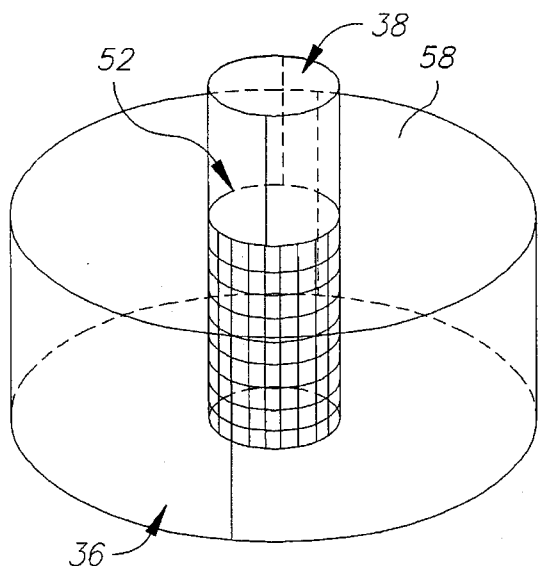
Figure 31:
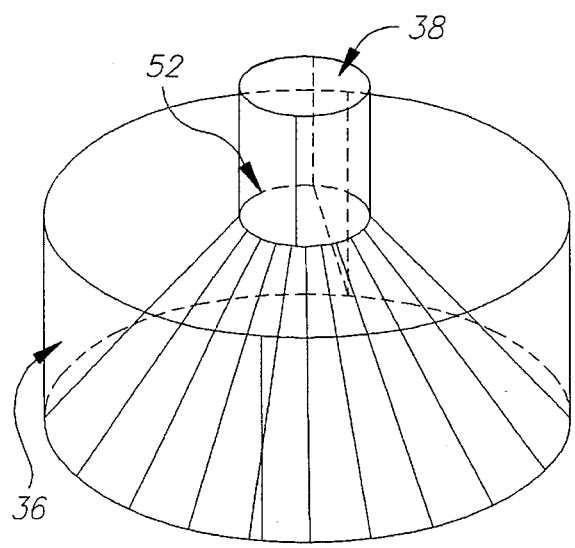
Figure 32:
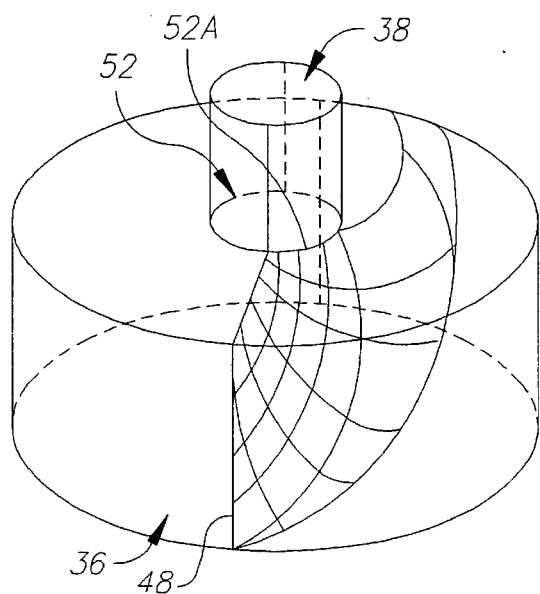
Figure 33:
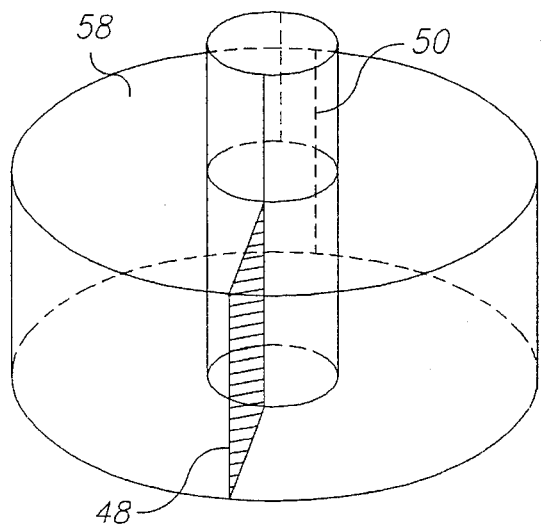
Figure 34:
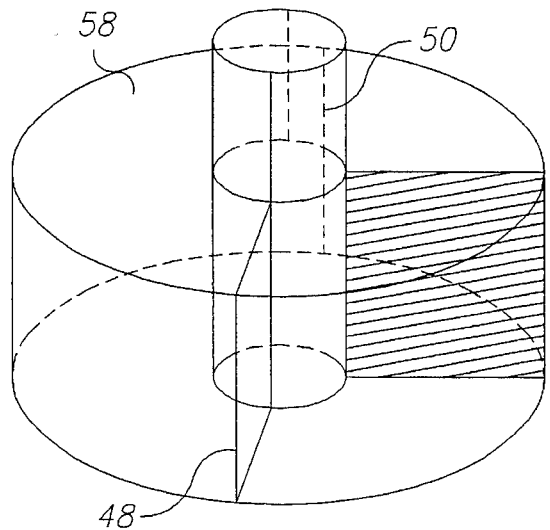
Figure 35:
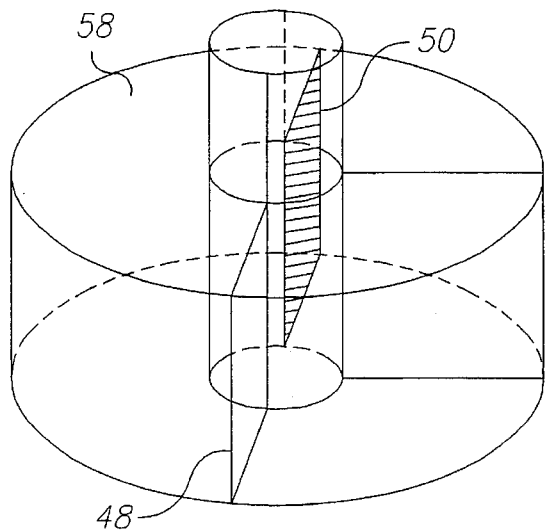
Figure 36:
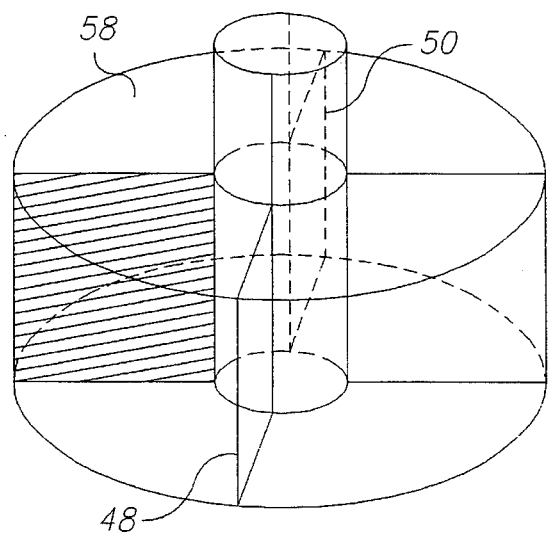
Figure 37:
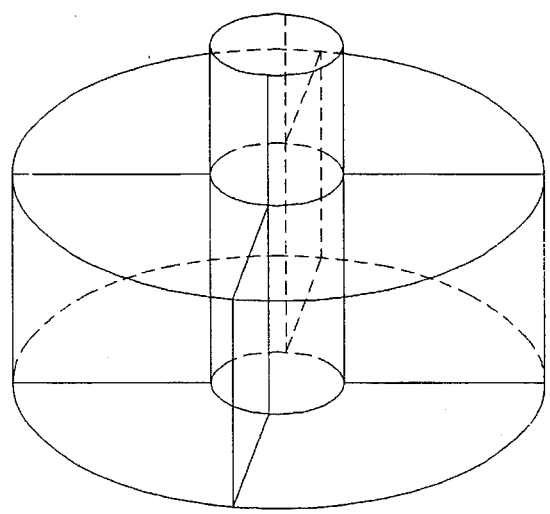
FIG. 37 is a perspective illustration of the second object of FIG. 25, showing the second object decomposed into cells, as per the completion of the method of the invention.

FIGS. 30, 31, and 32 show three additional slices made from the edge 52, granting that the slice of FIG. 27 has been made. The slice of FIG. 30 is similar to that of FIG. 28, extending the perimeter of the portion 38 downward through the portion 36, to produce another cylinder and the annulus 58 as in FIG. 28. The slice of FIG. 31 is conical, similar to the slice 60 of FIG. 29, and would divide the region 36 into a conical region and an annulus having a triangular cross section.

The slice of FIG. 32 is of a type which has been described in literature as a "skinning" surface, i.e., an algebraic surface which intersects two different algebraic curves. In this case, one of the algebraic curves is the edge 48, the line running axially along the surface 40 of the lower portion 36. The other edge of the skinning surface is the edge 52A. The edge 52A is curved, while the edge is straight. Accordingly, the slice of FIG. 32 is curved to conform with both edges. Because of constraints inherent in an algebraic expression which defines a surface including both the straight edge 48 and the curved edge 52A, the surface intersects other faces of the lower portion 36 along lines or curves which do not necessarily conform to the existing edges or vertices of the lower portion 36.

From these three possible slices, the slice of FIG. 30 is selected. The inner cylindrical part of the upper portion 36 is now a separate region which also falls within the expanded definition of cell. The outer part of the inner portion 36 is now an annulus 58, as would have been the case of the slice FIG. 28 had been made. The annulus is a non-cell region, and will be further subdivided. Thus, making the slice of FIG. 30 results in three regions, two of which are cells, the two cells and their faces all being well shaped.

The slice of FIG. 31 would have produced two poorly shaped, non-cell regions, as was the case with the slice of FIG. 29. The slice of FIG. 32 would have subdivided the region 36 into a single, poorly shaped region. Therefore, the score for the subdivision of FIG. 30 would have been the highest of the three scores, and the slice of FIG. 30 is selected accordingly.

The only remaining non-cell region is now the annulus 58. If the circular inner or outer perimeter edges are now treated as high priority edges, any interesting slices would produce poorly shaped regions. Therefore, high priority edges which run axially along the inner and outer perimeters of the annulus 58 are now used. FIGS. 33 through 36 show four slices, made through such axial edges at 90° intervals around the annulus 58. These slices produce four regions which are hexahedral, although two of their surfaces taken from the inner and outer curved surfaces of the annulus 58 are curved, and the inner surface is concave. Notwithstanding these surfaces, the four regions are relatively well shaped, and they fit the definition of "cell", which was expanded to accommodate regions having curved surfaces. Since all of the regions are now cells, the method of the invention is completed.

While the preferred embodiments of the present invention have been illustrated in detail, it should be apparent that modifications and adaptations those embodiments may occur to one skilled in the art without departing from the scope of the present invention as set forth in the following claims.

What is claimed is:

1. A method of operating a data processing system to simulate subdivision of an object into regions to facilitate computer analysis of the object, the method comprising the steps of:

receiving as an input a digital representation of the object;

identifying a plurality of slices that subdivide the object into regions;

calculating a score for each of the plurality of slices;

choosing one of the plurality of slices based on the scores calculated by the step of calculating;

subdividing the object with the chosen slice; and providing a digital output representative of the subdivided object.

2. A method as recited in claim 1, wherein the step of calculating includes one of (i) calculating the scores in series, by a single processor, and (ii) calculating the scores in parallel, by a plurality of parallel processors.

3. A method as recited in claim 1, wherein:

the object includes a plurality of regions, and the steps of calculating and choosing are performed for each of the regions one of (i) in parallel, by a plurality of parallel processors, and (ii) in series, by a single processor.

4. A method as recited in claim 1, further comprising the step of selecting the plurality of slices, for which the scores are to be calculated by the step of calculating, in terms of features of the object.

5. A method as recited in claim 4, wherein:

the digital representation of the object represents the object in terms of faces, edges between adjacent ones of the faces, and vertices between adjacent ones of the edges, the faces and edges being algebraic surfaces and algebraic curves, respectively, and the step of selecting operates to select the plurality of slices based on the faces, edges, and vertices of the object, each one of the plurality of selected slices being one of (i) a plane, and (ii) an algebraic curved surface.

6. A method as recited in claim 5, wherein the step of selecting includes:

selecting one of the edges; and selecting the plurality of slices as slices which include the selected one of the edges.

7. A method as recited in claim 6, wherein the step of selecting one of the edges is executed a plurality of times for the edges, one of (i) in series, by a single processor, and (ii) in parallel, by a plurality of parallel processors.

8. A method as recited in claim 6, wherein the step of selecting an edge includes selecting the edge based on at least one of the criteria:

(a) whether the two adjacent faces, between which is the selected edge, have an interior angle which falls within a predetermined range of values.

(b) whether at least one of the two adjacent faces, between which is the selected edge, has a curvature measurable in terms of a predetermined parameter whose value falls within a predetermined range of values, and (c) whether the length of the selected edge, relative to one of (i) other edges of the object and (ii) the overall size of the object, falls within a predetermined range of values.

9. A method as recited in claim 6, wherein the step of selecting the plurality of slices includes selecting slices which satisfy at least one of the following criteria:

(a) the slice is an extension of one of the two adjacent faces, between which is the selected one of the edges, (b) the slice includes a second one of the edges of the object, the second edge being visible from the selected edge, (c) the slice is normal to one of (i) one of the two adjacent faces, between which is the selected edge, the one adjacent face being visible from the selected edge, and (ii) another face of the object, the other face being visible from the selected edge, (d) the slice is normal to another edge of the object, the other edge being visible from the selected edge, and (e) the slice includes a vertex of the object other than vertices of the selected one of the edges, the included vertex being visible from the selected edge;

an edge, face, or vertex being visible from the selected edge if any line segment connecting a point of the selected edge with a point of the edge, face, or vertex is entirely within the region.

10. A method as recited in claim 1, further comprising the steps of:

determining whether the object includes any regions which do not conform to a predetermined criterion, and iteratively executing the steps of calculating, choosing, and determining, until it is determined in the step of determining that all of the regions of the object conform to the predetermined criterion.

11. A method as recited in claim 10, wherein the step of determining includes determining whether the regions of the object conform to the criterion of falling within a predetermined set of geometric elements.

12. A method as recited in claim 11, wherein, in the step of determining, the predetermined set includes tetrahedra, pentahedra, and hexahedra.

13. A method as recited in claim 1, wherein:

the method further comprises the step of calculating an initial score for the object without any of the plurality of slices; and the step of choosing includes selecting the one of the plurality of slices based on which of the scores maximizes a ratio of the score with the slice to the score without any slices produced in the step of calculating.

14. A method as recited in claim 13, further comprising the steps of:

determining whether the object includes any regions which do not conform to a predetermined criterion, and iteratively executing the steps of calculating, choosing, and determining, until it is determined in the step of determining that all of the regions of the object conform to the predetermined criterion.

15. A method as recited in claim 14, wherein the step of determining includes determining whether the regions of the object conform to the criterion of falling within a predetermined set of geometric elements.

16. A method as recited in claim 15, wherein, in the step of determining, the predetermined set includes tetrahedra, pentahedra, and hexahedra.

17. A method as recited in claim 16, wherein the step of calculating a score for a slice includes calculating according to the formula $$s = \frac{(C+1)(Q+1)\overline{\sigma_f}\overline{\sigma_r}}{(R+1)(F+1)}$$

where s is the score, C is the number of regions of the object which meet the definition of cell, R is the total number of regions of the object, Q is the number of quadrilateral faces of the regions of the object, F is the total number of faces of the object, $\overline{\sigma_f}$ is an average of shape coefficients $\sigma_f(f)$ for the faces of the object, and $\overline{\sigma_r}$ is an average of shape coefficients $\sigma_r(r)$ for the regions of the object.

18. A method as recited in claim 17, wherein, in the step of calculating, the shape $\sigma_f(f)$ of a face f of the object, having area A and perimeter p, is given by the formula $$\sigma_f(f) = \frac{A}{4\pi p^2}$$

and the shape $\sigma_r(r)$ of a region r of the object, having surface area A and volume V, is given by the formula $$\sigma_r(r) = \frac{V^2}{36\pi A^3}$$

19. A digital data processing system for simulating subdivision of an object to facilitate computer analysis of the object, the system comprising:

a memory;

at least one processor; and program instruction code means, for execution by the at least one processor, for directing the digital data processing system to perform method steps for subdividing an object into regions, the program code means comprising:

means for receiving, as an input, a distal representation of a physical object;

means for identifying a plurality of slices that subdivide the object into regions;

means for calculating a score for each of the plurality of slices;

means for choosing one of the plurality of slices based on the calculated scores for slices;

means for subdividing the object with the chosen slice; and means for providing a digital output representative of the subdivided object.

20. A system as recited in claim 19, wherein the means for calculating includes one of (i) a single processing means for calculating the scores in series, and (ii) parallel processing means for calculating the scores in parallel.

21. A system as recited in claim 19, wherein:

the object includes a plurality of regions, and the means for calculating and choosing include one of (i) parallel processing means for calculating and choosing for each of the regions in parallel, and (ii) a single processing means for calculating and choosing for each of the regions in series.

22. A system as recited in claim 19, further comprising means for selecting the plurality of slices, for which the scores are to be calculated by the means for calculating, in terms of features of the object.

23. A system as recited in claim 22, wherein:

the object is represented in terms of faces, edges between adjacent ones of the faces, and vertices between adjacent ones of the edges, the faces and edges being algebraic surfaces and algebraic curves, respectively, and the means for selecting includes means for selecting the plurality of slices based on the faces, edges, and vertices of the object, each one of the plurality of selected slices being one of (i) a plane, and (ii) a curved algebraic surface.

24. A system as recited in claim 23, wherein the means for selecting includes:

means for selecting one of the edges; and means for selecting the plurality of slices as slices which include the selected one of the edges.

25. A system as recited in claim 24, wherein the means for selecting one of the edges includes one of (i) a plurality of parallel processors for selecting the edges in parallel, and (ii) a single processor for selecting the edges in series.

26. A system as recited in claim 24, wherein the means for selecting an edge includes means for selecting the edge based on at east one of the criteria:
(a) whether the two adjacent faces, between which is the selected edge, have an interior angle which falls within a predetermined range of values,
(b) whether at least one of the two adjacent faces, between which is the selected edge, has a curvature measurable in terms of a predetermined parameter whose values falls within a predetermined range of values, and
(c) whether the length of the selected edge, relative to one of (i) other edges of the object and (ii) the overall size of the object, falls within a predetermined range of values.

27. A system as recited in claim 24, wherein the means for selecting the plurality of slices includes means for selecting slices which satisfy at least one of the following criteria:
(a) the slice is an extension of one of the two adjacent faces, between which is selected one of the edges,
(b) the slice includes another one of the edges of the object, the other edge being visible from the selected edge,
(c) the slice is normal to one of (i) one of the two adjacent faces, between which is the selected edge, the one adjacent face being visible from the selected edge, and (ii) another face of the object, the other face being visible from the selected edge,
(d) the slice is normal to another edge of the object, the other edge being visible form the selected edge, and
(e) the slice includes a vertex of the object other than vertices of the selected one of the edges, the included vertex being visible from the selected edge;
an edge, face, or vertex being visible from the selected edge if any line segment connecting a point of the selected edge with a point of the edge, face, or vertex is entirely within the region.

28. A system as recited in claim 19, further comprising:
means for determining whether the object includes any regions which do not conform to a predetermined criterion, and
means for iteratively operating the means for calculating, choosing, and determining, until it is determined by the means for determining that all of the regions of the object conform to the predetermined criterion.

29. A system as recited in claim 28, wherein the means for determining includes means for determining whether the regions of the object conform to the criterion of falling within a predetermined set of geometric elements.

30. A system as recited in claim 29, wherein in the means for determining, the predetermined set includes tetrahedra, pentahedra, and hexahedra.

31. A system as recited in claim 19 wherein:
the system further comprises means for calculating an initial score for the object without any of the plurality of slices; and
the means for choosing includes means for selecting the one of the plurality of slices based on which of the scores maximizes a ratio of the score with the slice to the score without any slices produced by the means for calculating.

32. A system as recited in claim 31, further comprising;
means for determining whether the object includes any regions which do not conform to a predetermined criterion, and
means for iteratively operating the means for calculating, choosing, and determining, until it is determined by the means for determining that all of the regions of the object conform to the predetermined criterion.

33. A system as recited in claim 32, wherein the means for determining includes means for determining whether the regions of the object conform to the criterion of falling within a predetermined set of geometric elements.

34. A system as recited in claim 33, wherein, in the means for determining, the predetermined set includes tetrahedra, pentahedra, and hexahedra.

35. A system as recited in claim 34, wherein the means for calculating a score for a slice includes means for calculating according to the formula $$s = \frac{(C+1)(Q+1)\overline{\sigma_f}\overline{\sigma_r}}{(R+1)(F+1)}$$

where s is the score, C is the number of regions of the object which meet the definition of cell, R is the total number of regions of the object, Q is the number of quadrilateral faces of the regions of the object, F is the total number of faces of the object, $\overline{\sigma_f}$ is an average of shape coefficients $\sigma_f(f)$ for the faces of the object, and $\overline{\sigma_r}$ is an average of shape coefficients $\sigma_f(r)$ for the regions of the object.

36. A system as recited in claim 35, wherein, in the means for calculating, the shape $\sigma_f(f)$ of a face f of the object, having area A and perimeter p, is given by the formula $$\sigma_f(f) = \frac{a}{4\pi p^2}$$

and the shape $\sigma_f(r)$ of a region r of the object, having surface area A and volume V, is given by the formula $$\sigma_r(r) = \frac{V^2}{36\pi A^3}.$$

37. A machine-readable digital data storage device tangibly embodying a program of instruction executable by a processing system for performing method steps to subdivide an object into regions to facilitate computer analysis of the object, the method steps comprising:
receiving, as an input, a digital representation of a physical object;
identifying a plurality of slices that subdivide the object into regions;
calculating a score for each of the plurality of slices;
choosing one of the plurality of slices based on the scores calculated;
subdividing the object with a chosen slice; and
providing a digital output representative of the subdivided object.

38. A storage device as recited in claim 37, wherein the step of calculating is performed in parallel on a plurality of parallel processors.

39. A storage device as recited in claim 37, wherein:
the object includes a plurality of regions, and
the step of calculating is performed in parallel on a plurality of parallel processors.

40. A storage device as recited in claim 37, the method steps further comprising steps of selecting the plurality of slices, for which the scores are to be calculated in terms of features for the object.

41. A storage device as recited in claim 40, wherein:
the object is represented in terms of faces, edges between adjacent ones of the faces, and vertices between adjacent ones of the edges, the faces and edges being algebraic surfaces and algebraic curves, respectively, and the plurality of slices are selected based on the faces, edges, and vertices of the object, each one of the plurality of selected slices being one of (i) a plane, and (ii) an algebraic curved surface.

42. A storage device as recited in claim 41 wherein the selecting step includes the steps of: selecting one of the edges; and selecting the plurality of slices as slices which include the selected one of the edges.

43. A storage device as recited in claim 42, wherein the step of selecting one of the edges includes one of the following steps of (i) selecting the edges in parallel by means of a plurality of parallel processors, and (ii) selecting the edges in series by means of a single processor.

44. A storage device as recited in claim 42, wherein the step of selecting one of the edges includes the steps of selecting an edge based on at least one of the criteria:

(a) whether the two adjacent faces, between which is the selected edge, have an interior angle which falls within a predetermined range of values, (b) whether at least one of the two adjacent faces, between which is the selected edge, has a curvature measurable in terms of a predetermined parameter whose value falls within a predetermined range of values, and (c) whether the length of the selected edge, relative to one of (i) other edges of the object and (ii) the overall size of the object, falls within a predetermined range of values.

45. A storage device as recited in claim 42, wherein the step of selecting the plurality of slices includes the steps of selecting slices which satisfy at least one of the following criteria:

(a) the slice is an extension of one of the two adjacent faces, between which is the selected one of the edges, (b) the slice includes another one of the edges of the object, the other edge being visible from the selected edge, (c) the slice is normal to one of (i) one of the two adjacent faces, between which is the selected edge, the one adjacent face being visible from the selected edge, and (ii) another face of the object, the other face being visible from the selected edge, (d) the slice is normal to another edge of the object, the other edge being visible from the selected edge, and (e) the slice includes a vertex of the object other than vertices of the selected once of the edges, the included vertex being visible from the selected edge, and edge, face, or vertex being visible from the selected edge if any line segment connecting a point of the selected edge with a point of the edge, face, or vertex is entirely within the region.

46. A storage device as recited in claim 37, the method steps further comprising:

determining whether the object includes any regions which do not conform to a predetermined criterion, and iteratively performing the calculating, choosing, and determining steps until it is determined that all of the regions of the object conform to the predetermined criterion.

47. A storage device as recited in claim 46, wherein the determining step includes the steps of determining whether the regions of the object conform to the criterion of falling within a predetermined set of geometric elements.

48. A storage device as recited in claim 47, wherein the predetermined set includes tetrahedra, pentahedra, and hexahedra.

49. A storage device as recited in claim 37, wherein: p1 the method steps further comprise the steps of calculating an initial score for the object without any of the plurality of slices; and the choosing step includes a step of selecting one of the plurality of slices based on which of the scores maximizes a ratio of the score with the slice to the score without any slices produced by the means for directing to calculate.

50. A storage device as recited in claim 49, the method steps further comprising the steps of:

determining whether the object includes any regions which do not conform to a predetermined criterion, and wherein the iteratively performing the calculating, choosing, and determining steps until it is determined that all of the regions of the object conform to the predetermined criterion.

51. A storage device as recited in claim 50, wherein the determining step includes the steps of determining whether the regions of the object conform to the criterion of falling within a predetermined set of geometric elements.

52. A storage device as recited in claim 51, wherein the predetermined set includes tetrahedra, pentahedra, and hexahedra.

53. A storage device as recited in claim 52, wherein the step of calculating an initial score is performed according to the formula $$s = \frac{(C+1)(Q+1)\overline{\sigma_f}\overline{\sigma_r}}{(R+1)(F+1)}$$

where s is the score, C is the number of regions of the object which meet the definition of cell, R is the total number of regions of the object, Q is the number of quadrilateral faces of the regions of the object, F is the total number of faces of the object, $\overline{\sigma_f}$ is an average of shape coefficients $\sigma_f(f)$ for the faces of the object, and $\overline{\sigma_r}$, is an average of shape coefficients $\sigma_r(r)$ for the regions of the object.

54. A storage device as recited in claim 53, wherein the shape $\sigma_f(f)$ of a face f of the object, having area A and perimeter p, is given by the formula $$\sigma_f(f) = \frac{A}{4\pi p^2}$$

and the shape $\sigma_r(r)$ of a region r or the object, having surface area A and volume V, is given by the formula $$\sigma_r(r) = \frac{V^2}{36\pi A^3} .$$

* * * * *